United States Patent [19]

Milton et al.

[11] Patent Number: 5,064,104
[45] Date of Patent: Nov. 12, 1991

[54] APPARATUS FOR VENDING A PRODUCT

[75] Inventors: Edward L. Milton; Russell G. Landon, both of Idaho Falls; Byard A. Cox, Ucon, all of Id.

[73] Assignee: MilancoLimited, Inc., Idaho Falls, Id.

[21] Appl. No.: 565,279

[22] Filed: Aug. 9, 1990

Related U.S. Application Data

[63] Continuation of Ser. No. 264,206, Oct. 28, 1988, abandoned.

[51] Int. Cl.⁵ .................... G01F 11/24; G07F 13/02
[52] U.S. Cl. .................................... 222/306; 222/352
[58] Field of Search ................ 194/350; 222/48, 306, 222/347, 349, 350, 352, 368, 556; 221/12, 196, 203, 266, 306; 232/14, 57, 57.5, 55, 65

[56] References Cited

U.S. PATENT DOCUMENTS

| | | | |
|---|---|---|---|
| 985,382 | 2/1911 | Walter | 221/266 X |
| 1,038,178 | 9/1912 | Mills | 222/352 X |
| 1,109,134 | 9/1914 | Millard | 221/203 |
| 1,226,108 | 5/1917 | Olney | 222/368 X |
| 2,154,443 | 4/1939 | French | 221/108 |
| 2,259,710 | 10/1941 | Stern | 221/107 |
| 2,680,540 | 6/1954 | Probasco | 222/349 |
| 3,465,919 | 9/1969 | Sizer | 222/146 |
| 4,679,684 | 7/1987 | Glaser | 194/350 |

Primary Examiner—F. J. Bartuska
Attorney, Agent, or Firm—Workman, Nydegger & Jensen

[57] ABSTRACT

A coin-operated vending machine and method for dispensing a product which includes a novel dispensing wheel design which prevents bridging of the product. A funnel is used to direct product from the product reservoir into the dispensing cup which has a large cross-sectional area. Front and back antibleed flaps prevent product from bleeding through to the coin drawer and to the dispensing chute. All the seams of the vending machine incorporate a unique overlap design to prevent nondestructive entry into the machine. The coin drawer includes sections to distinguish the revenue generated by each product used in the machine. Additionally, the chute flap eliminates springs by utilizing an eccentric hinge. The present invention also enables the product to be quickly and easily removed from the machine when servicing the machine.

1 Claim, 4 Drawing Sheets

APPARATUS FOR VENDING A PRODUCT

This application is a continuation of application Ser. No. 07/264,206 filed Oct. 28, 1988, now abandoned.

BACKGROUND

1. Field of the Invention

The present invention relates to methods and apparatus for dispensing a predetermined amount of product. More particularly, the present invention includes new and improved coin-operated vending machine for dispensing various types of products

2. The Background of the Invention

Vending machines have long been recognized as an efficient means for selling a wide variety of items without the necessity of employing someone to personally wait on the customer. Some of the first vending machines made were used to dispense gum, hard candy, and other small, consistently sized items. Such machines did not require electricity and were mechanically dependable to varying degrees. Many of these "old-fashioned" vending machines have significant value today as collector's items and are quickly identified by their heavy metal base and glass "globe."

Most of the vending machines used today are large, requiring a substantial amount of space for their use. Additionally, they are usually electrically powered thereby adding cost to their use and decreasing the profit margin for the owner of the machine. Because of the complexity of their design, such machines are prohibitively expensive for most people. Thus, the use of such "modern" machines is not practical for many applications.

For many applications, such as for vending small quantities of candy or gum, a variation on the old-fashioned vending machine is still preferred. Such mechanical vending machines, frequently made out of plastic, are ideal for dispensing a small amount of candy, gum, or other items without the need for a large space or the use of electricity.

These machines are mechanically operated by depositing a coin in a coin slot and twisting a knob attached to the coin mechanism. The coin mechanism is usually connected to a dispensing cup which takes a predetermined amount of product from the "globe," or product reservoir, and deposits the product down a "chute." The consumer may then remove the product from the machine by opening the chute cover and allowing the product to fall out of the chute.

Although such vending machines have many advantages over the large electric vending machines used to vend most packaged products, they do suffer from several disadvantages. For example, a common problem from which many small vending machines suffer is that, under certain circumstances, the product being sold in the machine tends to "bridge;" that is, the product becomes stuck and will not flow from the product reservoir into the dispensing cup as it should. Whether a product will bridge is a function of the size of the product and how the products reacts when subjected to various temperatures. Many products become tacky when the ambient temperature is increased above normal room temperature.

When bridging of the product occurs, the consumer will twist the coin mechanism only to discover that no product is dispensed. Obviously, the results in consumer complaints and forces the owner of the machine to spend time maintaining the machine.

Another problem often associated with such mechanical vending machines is that the machines lack versatility. Given the wide variety of products on the market which may be successfully used in a small mechanical vending machine, it is necessary that the vending machine have the capacity to adjust the amount of product that is dispensed to correspond to various sizes of products. It may also be desirable to adjust the amount of a product that is dispensed as the price of that product changes.

One method used by the prior art to adjust the amount of product that is dispensed is to employ an adjustable sidewall in the dispensing cup. By moving the sidewall, the effective volume of the cup may be increased or decreased as desired. A significant disadvantage to the use of an adjustable sidewall, however, is that as the sidewall is adjusted to provide for a smaller volume in the cup, the area of the opening of the cup is decreased a proportionate amount. Having a smaller opening in the dispensing cup increases the likelihood that the product will bridge.

Another problem frequently found in mechanical vending machines is that product from the product reservoir can be forced into the dispensing chute by shaking the machine. For example, this could occur when the coin mechanism is turned approximately half way thereby placing the dispensing cup in open connection with the product reservoir and the dispensing chute at the same time. With the dispensing cup in that position, product will flow through the opening created by the dispensing cup when the machine is shaken vigorously.

A similar problem may occur when the dispensing cup is rotated into a position where it is in open connection with the product reservoir and with the inside of the machine where the coin drawer is housed. The product which falls into the coin drawer may become contaminated or dirty thereby preventing the owner of the machine from placing the product back into the product reservoir. Also, having product bleed into the back of the machine may significantly reduce the effective amount of product available for vending. Additionally, increased time is required of the owner of the machine because the back of the machine must be cleaned out each time the machine is serviced.

One of the most significant problems associated with the use of small mechanical vending machines is their susceptibility to burglary. To keep manufacturing costs of these machines to a minimum, many of the machines are made of plastic. It has been found, however, that machines will generally not be broken into if destruction of the machine would result. Thus, although machines made of plastic may be easily destroyed and the money removed, this seldom occurs.

Most of the plastics used in the construction of these machines, however, are readily deformable without being destroyed. Thus, a thief may use a screwdriver to create an opening in a seam of the machine and extract money or product without destroying the machine Most machines have several locations where one could insert a screwdriver or other similar implement to create enough of an opening to extract product or money. For example, the glass globe used on older machines has largely been replaced with clear plastic windows. The perimeter of these plastic windows is frequently a point of entry for someone desiring to steal product or money.

The majority of mechanical vending machines have at least two access doors—one to provide access to the product reservoir and one to provide access to the coin drawer. Although a variety of locks have been employed on these doors by the prior art, a common design failure is that the edges of the doors may be readily penetrable as described above.

It is often desirable to offer a variety of products in a vending machine, thereby increasing the probability that one of the products in the machine will appeal to all potential customers. Thus, many machines offer two or three selections of product. A disadvantage of such machines, however, is that the owner of the machine is unable to accurately ascertain how much revenue each type of product is generating. As the coins are ejected into the coin drawer by the coin mechanism, they are all mixed together, thereby preventing the owner of the machine to determine which products are the most profitable Mechanical vending machines are widely used because they employ few moving parts and are simple in design. The simplicity of their design ensures that little maintenance is required to keep the machine in working order. Thus, to the extent extra parts may be eliminated from the machine, the necessity of potentially having to repair that part is eliminated. However, because of the design demands placed on the machines, the existence of some moving parts is inevitable.

One part which is generally thought could not be eliminated is the spring employed on the chute flap. When the coin mechanism is rotated, product is released from the dispensing cup and travels down the chute. It accumulates in the chute directly behind the chute flap until the consumer opens the flap. The product then falls out of the chute and into the consumer's hand. If the chute flap does not stay closed when contacted by the product, the product will fall onto the floor if the consumer is not prepared to catch it.

To ensure that the chute flap stays closed against the back pressure applied by the product, a spring is employed which biases the chute flap closed When the spring fails, however, it is often difficult to obtain a replacement spring. Thus, many machines in which springs have failed continue to be used without the spring.

Although most mechanical vending machines are designed to quickly and easily dispense product through the dispensing chute as the coin mechanism is turned, removing the product directly from the product reservoir when servicing the machine can be extremely burdensome. The owner of the machine must usually either use a small cup or scoop to remove the product directly from the reservoir or physically turn over the machine to pour out the product.

Removing the product from the reservoir with a scoop is disadvantageous because it is time consuming. Also, there will always remain in the bottom of the reservoir a small quantity of product which cannot be removed by a scoop. Thus, the owner must remove these pieces of product one at a time or turn over the machine to remove these last pieces.

It is impractical to turn over many machines because they are frequently mounted on pedestals. Even if the pedestal/vending machine combination may be turned over, the pedestal-mounted machine is awkward to handle. This gives rise to a risk that the owner could drop the machine while trying to empty the product from the reservoir thereby damaging or permanently destroying the machine.

It will be appreciated, therefore, that what is needed in the art are methods and apparatus for vending a product which are small, mechanically dependable, and do not require electricity to operate. It would also be an enhancement in the art if such methods and apparatus prevented the product being vended from bridging. It would be a further enhancement in the art if such methods and apparatus included means for adjusting the amount of product dispensed with each sale without decreasing the area of the opening of the dispensing cup.

It would be yet a further enhancement in the art if such methods and apparatus did not allow the product being vended to freely flow from the product reservoir to either the dispensing chute or to the coin drawer. Indeed, it would be an advancement in the art if such methods and apparatus were designed to be resistant to burglary of the product being vended and of any money accumulated. It would also be an advancement in the art if such methods and apparatus could be used to accurately ascertain the amount of revenue generated by different products sold in the same machine.

It would be an additional advancement in the art if such methods and apparatus could be employed such that no springs are required for use on the chute flap while keeping the chute flap sufficiently biased against the chute that it will not open when subject to back pressure from product dispensed through the machine. It would be yet a further advancement in the art if such methods and apparatus could be provided such that any unsold product could be quickly and easily removed from the reservoir without having to turn the machine over or manually remove the product with a scoop or similar device.

Such methods and apparatus are disclosed and claimed herein.

BRIEF SUMMARY AND OBJECTS OF THE INVENTION

The present invention includes novel methods and apparatus for dispensing a product, such as candy, peanuts, or the like, in a coin-operated vending machine. The machine is lightweight, does not require electrical power to operate, and is small, rendering its use ideal in many locations not otherwise suitable for use with larger, electric vending machines.

Because of its unique design, the vending machine of the present invention virtually eliminates bridging of the product. The vending incorporates a new funnel design between the product reservoir and the dispensing cup which allows for a larger opening at the base of the product reservoir thereby reducing the possibility of product bridging.

Additionally, the present invention includes a novel dispensing mechanism which, in one presently preferred embodiment, includes three dispensing cups. Each of these cups is incorporated in "wheel" which rotates as the coin mechanism is rotated. As the dispensing cups pass through the funnel, thereby exposing the dispensing cups to the product reservoir, the trailing edge of the dispensing cup agitates the product in the product reservoir. This "stirring" of the product also serves to reduce the possibility of product bridging.

In one preferred embodiment, the dispensing wheel includes three cups configured such that with each rotation of the coin mechanism, the product is stirred by the trailing edge of one cup and the following cup is filled with product. The immediacy with which a cup is filled with product following this "stirring" of the product ensures that the product will not settle into a bridging position between sales of product.

The volume of the dispensing cups employed by the present invention is incrementally adjustable. However, contrary to the dispensing cups of the prior art, the volume of the dispensing cups of the present invention may be increased or decreased without altering the area of the opening of the cup. The dispensing cups are configured with a unique floor design which may be adjusted to a variety of levels. By only adjusting the height of the floor, the area of the opening of the cup is not altered. Thus, product is not restricted as it flows through the funnel at the base of the product reservoir and into the dispensing cup.

Antibleed flaps are positioned on each side of the opening in the funnel and configured to follow the geometry of the dispensing wheel. The antibleed flaps prevent the opening in the cups from being exposed while the cups are in open connection with the product reservoir.

The front antibleed flap keeps the product within the dispensing cup contained until after the trailing edge of the dispensing cup has passed the opening of the product reservoir. After the wheel has been rotated to the point that no more product can enter the cup from the product reservoir, further rotation of the wheel extends the opening in the cup beyond the front antibleed flap. At this point, the product may fall from the cup into the dispensing chute and to the consumer. Thus, at no point during the rotation of the wheel is the opening in the dispensing cup simultaneously in open connection with both the product reservoir and the dispensing chute.

The back antibleed flap works in much the same manner. It is positioned to cover that portion of the opening of the dispensing cup which is open to the coin drawer when the dispensing cup is also in open connection with the product reservoir. Thus, as the wheel is being rotated into open connection with the dispensing reservoir, product is restricted from using the dispensing cup as a channel through which it may flow into the coin drawer.

The present invention incorporates many anti-theft devices to deter attempts to remove money or product from the machine by nondestructive force. For ease of manufacture, the housing of the vending machine is made in two pieces which are attached by sonic welding. The exterior seams are configured such that the resulting exterior wall is smooth. That is, although there is an overlap of the two pieces, the pieces butt together on the exterior side of the machine. This configuration prevents a screwdriver of other implement from being inserted in the seam to create an opening through which be removed from the machine.

Additionally, the lens on the product reservoir through which the consumer can observe the product being vended has traditionally been a point of entry for theft. In the present invention, the lens is rigidly mounted to the housing with screws inserted from the interior of the machine. Thus, at the exterior edges of the lens where one might attempt to insert a screwdriver to create an opening, the lens is securely fastened to the machine housing to prevent such an intrusion.

The present invention also incorporates a novel lid design and locking mechanism to deter and prevent theft of the product. The lid is designed to slide onto the top of the vending machine. The edges of the top of the vending machine are configured with a track upon which the lid may slide. Thus, when the lid is on the machine, it is virtually impossible to create an opening in the space between the lid and the machine without causing substantial destruction to the machine.

The present invention solves the problem of not being able to differentiate how much income is generated by various types of products in a multiple-product machine. The invention employs a coin drawer having separate sections for each product being vended. The coin drawer is configured such that as the coin is expelled from the coin mechanism, it lands in the section of the coin drawer corresponding to that product. Thus, when the machine is serviced, the owner of the machine can readily distinguish the money generated by each product.

The chute flap of the present invention does not employ a spring to keep it biased against the dispensing chute, as is traditionally thought by the prior art to be required. Instead, the chute flap utilizes a hinge which is eccentrically mounted. This unique method of mounting the hinge flap causes the flap to be naturally biased against the dispensing chute. As the candy is dispensed down the chute, it will rest against the hinge flap and the force exerted by the candy against the hinge flap is not sufficient to cause the hinge flap to open.

When servicing vending machines it is often desirable to empty out all the product from the product reservoir. This may be done quickly and easily when using the present invention without having to turn over the machine or removing the product with a scoop. The dispensing wheel of the present invention is axially mounted such that the wheel may be easily removed from its axis. To empty out the product, the wheel is removed from its axis and retracted slightly towards the back of the machine such that a space is opened up through which the product may flow directly from the product reservoir to the dispensing chute. At that point, a container may be placed beneath the dispensing chute to gather the product as it exits the machine.

It is, therefore, a primary object of the present invention to provide methods and apparatus for vending a product which are mechanically dependable, do not require a large of amount of space, and do not require electricity.

It is a further object of the present invention to provide such methods and apparatus for dispensing a product through a coin-operated vending machine such that the possibility that the product will bridge is reduced to a minimum.

It is an additional object of the present invention to provide methods and apparatus for vending a product in which the amount of product dispensed with each sale may be regulated by adjusting the volume of the dispensing cup without changing the area of the opening of the dispensing cup.

It is yet a further object of the present invention to provide such methods and apparatus such that the product will not bleed through the machine either to the consumer or to the coin drawer, even though the machine may be subject to vigorous shaking.

It is also an object of the present invention to provide such methods and apparatus which deter theft of the product and money accumulated in the machine by preventing nondestructive entry into the machine.

Another object of the present invention is to provide methods and apparatus for vending a variety of products such that the monies generated by each product may be accurately distinguished.

A further object of the present invention is to provide such methods and apparatus which incorporate a chute flap that does not employ a spring to keep it biased against the dispensing chute.

It is an additional object of the present invention to provide such methods and apparatus for vending a product in which the product may be emptied out of the machine quickly and easily without having to turn over the machine or having to manually remove the product from the product reservoir by using a scoop or other small container.

Other objects and advantages of the present invention will become apparent upon reading the following detailed description and appended claims, and upon reference to the accompanying drawings.

DETAILED DESCRIPTION OF THE PREFERRED EMBODIMENTS

Figure 1:
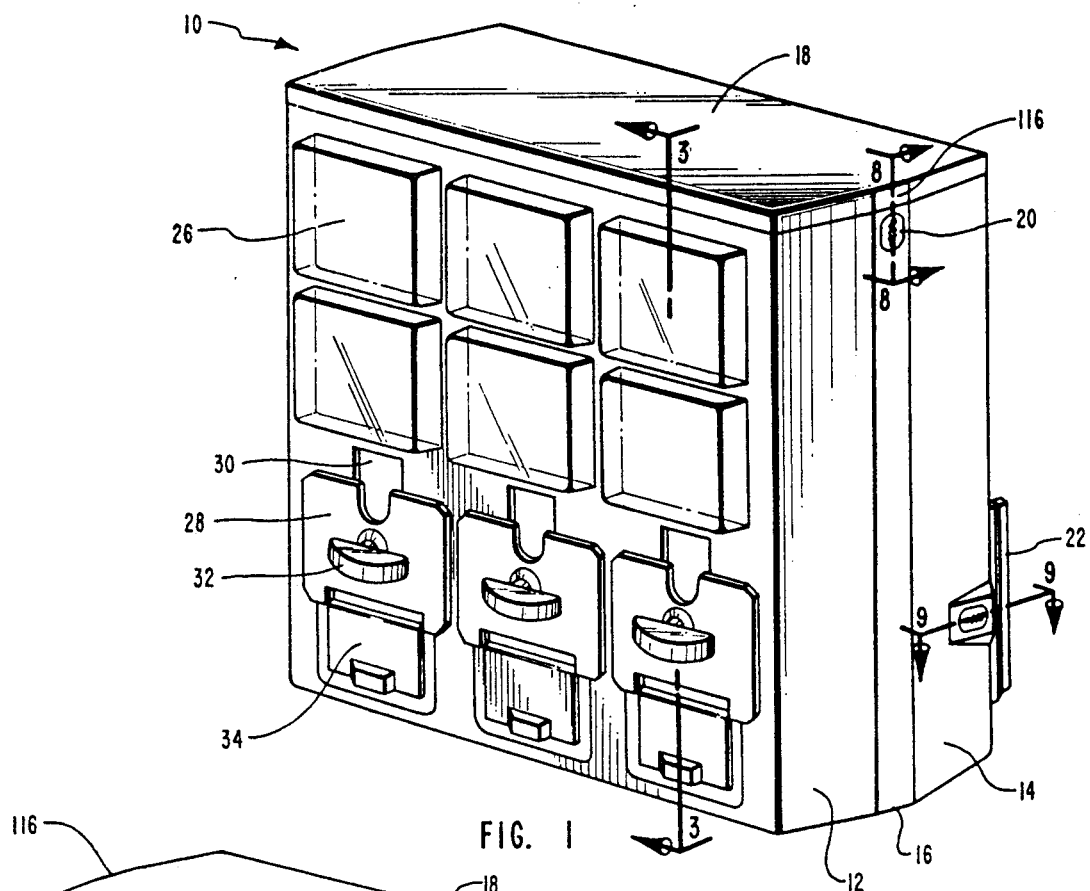
FIG. 1 is a perspective view of a vending machine according to the present invention.

Reference is now made to the drawings wherein like parts are designated with like numerals throughout. The present invention is directed to methods and apparatus for vending a product in a coin-operated vending machine. The vending machine of the present invention is illustrated in FIG. 1 and generally designated at 10.

Vending machine 10 includes a front housing 12 which is connected to a back housing 14 at a housing seam 16. The housing is made of plastic which enables vending machine 10 to be lightweight. The use of plastic also significantly reduces the costs of manufacture of the vending machine.

A lid 18 is provided which covers the opening at the top of the vending machine and provides an access to the product reservoir thereby facilitating servicing of the machine. Lid 18 is securely connected to the housing by means of a lid lock 20, mounted on seam 16 on the side of the machine.

An access door 22 to the coin drawer of the vending machine is provided in back housing 14 through which the coins collected in the machine may be removed. An access door lock 24 is mounted on the side of back housing 14 to securely lock the access door.

Still referring to FIG. 1, front housing 12 also includes a lens 26 through which a consumer may view the product being dispensed by the machine. A plurality of coin mechanisms 28 are also mounted in the front housing. It will be appreciated that although the vending machine in FIG. 1 is illustrated for use in vending three different products, the present invention may be configured for use in vending any number of products.

Each coin mechanism includes a coin slot 30 into which a coin may be inserted to activate the coin mechanism. Coin mechanism 28 may be any of those coin mechanisms conventionally known in the art of mechanical vending machines. Thus, coin slot 30 may be configured for use with any size coin, whether U.S. or foreign.

Coin mechanism 28 also includes a knob 32 which is rotated by the consumer after inserting a coin in the coin slot. Also attached to the coin mechanism is a chute flap 34 which may be opened by the consumer to remove the product after the product has been dispensed by the machine down the dispensing chute, as will be described in greater detail below.

Figure 2:
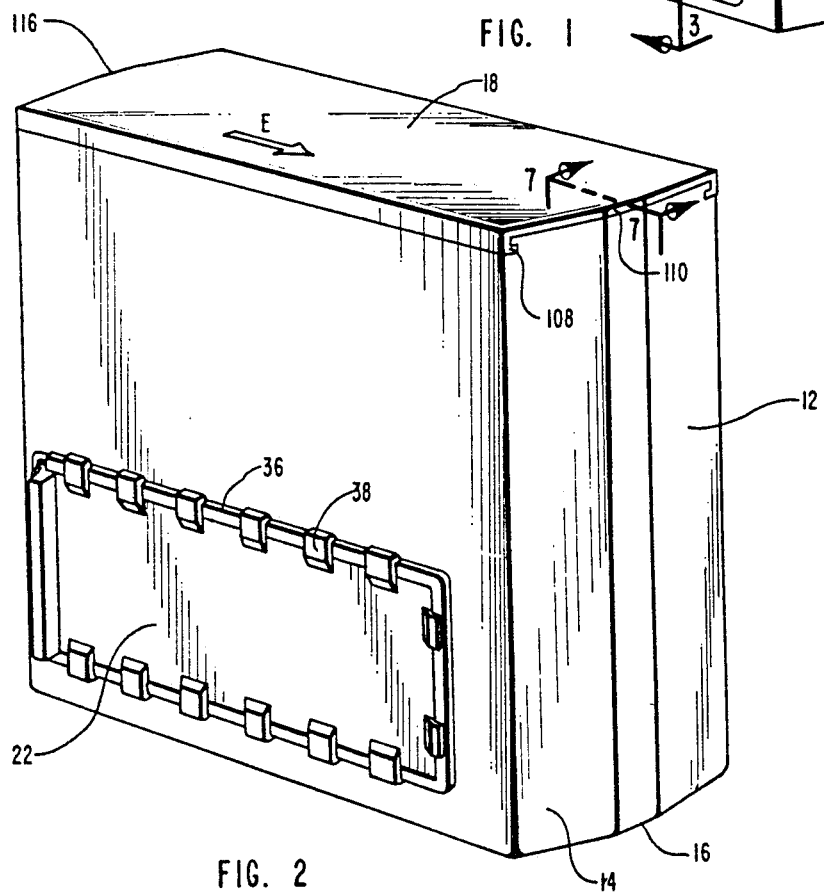
FIG. 2 is a perspective of the back of the vending machine illustrated in FIG. 1.

Referring now to FIG. 2, the back of vending machine 10 is more particularly illustrated. Back housing 14 is configured with a track 36 upon which access door 22 rests. Access door 22 includes a plurality of projections 38 specifically configured to fit around track 36. Access door 22 also includes a plurality of lips 40, shown in FIG. 3, between each projection 38 which fit inside track 36. The combination of the lips and the projections serve to sufficiently seal access door 22 to back housing 14 such that the vending machine is impenetrable at that point without causing substantial damage to the machine.

Figure 3:
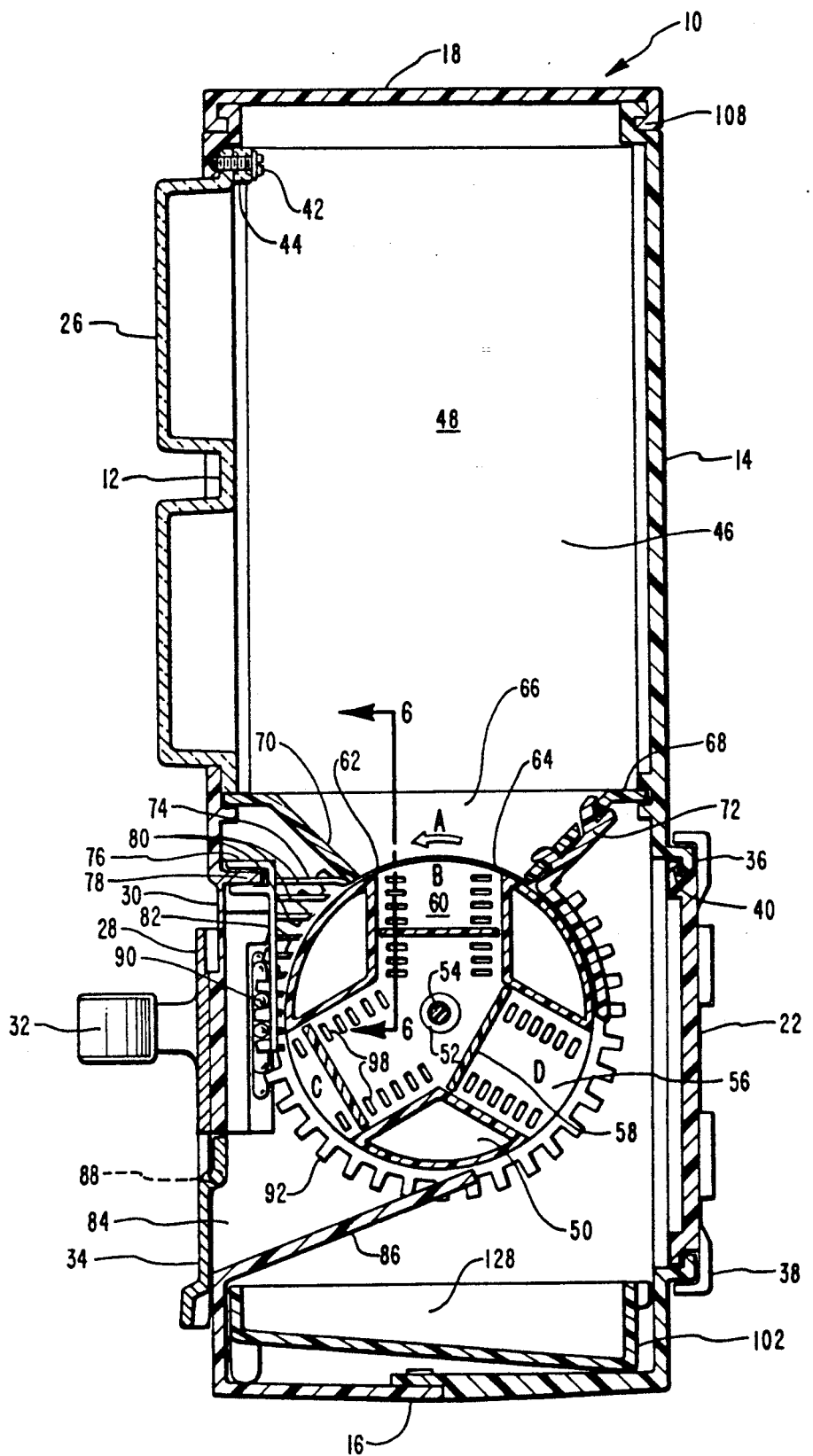
FIG. 3 is a cross-sectional view of the vending machine taken along line 3—3 of FIG. 1.

In FIG. 3, it can be observed that lens 26 is mounted to front housing 12 by a lens screw 42. Lens 26 is manufactured with a bubble 44 surrounding the hole provided for lens screw 42. Bubble 44 acts to distribute the stresses associated with lens screw 42 over a greater area of the lens. This serves to reduce the stress concentrations at that point and minimize the possibility that the lens will break when subjected to forces such as those likely to be applied to the lens if one were to attempt to forcibly enter the vending machine at the edge of the lens. Lens 26 is also held against front housing 12 by a reservoir wall 46 which separates one product reservoir 48 from the next and by a bracket (not shown in FIG. 3) at the lower edge of the lens.

A dispensing wheel 50 is illustrated in FIG. 3 and is rotatably mounted about a wheel axis 52 with an axial screw 54. Dispensing wheel 50, in this preferred embodiment of the invention, includes three dispensing cups 56. The dispensing wheel is mounted in its proper position by mounting arms 55 (illustrated in FIG. 4).

Each dispensing cup 56 has an adjustable floor 58, two sidewalls 60, a leading edge 62, and a trailing edge 64. In operation, dispensing wheel 50 rotates in the direction of arrow A, counterclockwise as viewed in FIG. 3. Thus, leading edge 62 is always that side of dispensing cup 56 which is the first portion of the dispensing cup to be rotated through product reservoir 48.

Still referring to FIG. 3, a funnel 66 is mounted at the base of product reservoir 48 and serves to direct product into dispensing cups 56. Funnel 66 includes a funnel backwall 68 and a scraper 70. The funnel is configured such that at its base it conforms to the geometry of dispensing wheel 50. The opening at the base of funnel 66 has approximately the same width as dispensing wheel 50. The length of that opening, as can be viewed in FIG. 3, is longer than the length of the opening in each dispensing cup 56.

The existence of this large opening in the funnel at the base of the product reservoir assists in preventing product bridging. Bridging frequently occurs because the product must flow through a small opening to fill a dispensing cup. When the product is large in size and/or sticky because of the temperature, the ability of the product to flow through such an opening is decreased.

By mounting the dispensing wheel such that it rotates at a right angle to the rotation of the coin mechanism, the vending machine may utilize a dispensing wheel having a diameter sufficiently large to accommodate the large opening at the base of the product reservoir. This configuration also keeps to a minimum the width of each section of the machine, allowing for a three-section machine, as illustrated in FIG. 1, which is not disproportionate in its dimensions.

Attached to funnel backwall 68 is a back antibleed flap 72. Back antibleed flap 72 is also configured to match the circular geometry of dispensing wheel 50 and extends along the perimeter of the dispensing wheel a distance approximately equal to the length of the opening in the dispensing cup. As used herein, the "length" of the opening of the dispensing cup refers to the approximate arcuate distance between trailing edge 64 and leading edge 62 of dispensing cup 56.

Mounted adjacent scraper 70 is a front antibleed flap 74. Front antibleed flap 74 includes a mounting bridge 76 by which it is mounted to a mounting projection 78 which protrudes from front housing 12. The front antibleed flap includes a plurality of flexible bristles 80 which extend out varying distances from the base 82 of the front antibleed flap. Each bristle 80 extends out to the edge of dispensing wheel 50.

A dispensing chute 84 is formed inside the vending machine beneath coin mechanism 28. The dispensing chute includes a dispensing platform 86 mounted on an angle and extending from the bottom of dispensing wheel 50 to a point near the bottom of chute flap 34. Chute flap 34 acts to prevent product released into the dispensing chute from exiting the machine until the consumer opens the chute flap. Chute flap 34 is mounted with a flap hinge 88 just below coin mechanism 28.

It is by activating coin mechanism 28 that dispensing wheel 50 is forced to rotate. A set of right angle gears are employed for this purpose. Connected to knob 32 is a driving gear 90 which meshes with a driven gear 92 around the perimeter of dispensing wheel 50. In this embodiment of the invention in which the dispensing wheel has three dispensing cups, the gear ratio is three-to-one. That is, for each rotation of the dispensing wheel, driving gear 90 rotates three times.

In operation, a product is placed in product reservoir 48. The product may be candy, gum, peanuts, or any other relatively small item. It is not necessary that the item being sold be edible. Many vending machines have successfully marketed small trinkets. By placing the product in the product reservoir, the consumer can readily view through lens 26 the product which is being vended.

When the consumer decides to purchase some of the product, a coin is deposited in coin slot 30 by the consumer. The consumer then rotates knob 32 which is connected directly to driving gear 90. As driving gear 90 is rotated, it forces driven gear 92 to rotate thereby causing dispensing wheel 50 to rotate about wheel axis 52 in the direction of arrow A.

Before the coin mechanism is actuated by inserting a coin and turning the knob, the dispensing cup which will next deliver product to the consumer is in the position labeled B in FIG. 3. The B position is when the dispensing cup is in open connection with product reservoir 48. In the B position, dispensing cup 56 is filled with product as the product flows from product reservoir 48, through funnel 66 and into the cup.

As the coin mechanism is actuated, the dispensing wheel is rotated in the direction of arrow A until dispensing cup 56 is in the C position. In the C position, the force of gravity causes all product contained within the dispensing cup to fall into dispensing chute 84. Once within the dispensing chute, the product travels down dispensing platform 86 to chute flap 34.

As will be discussed in greater detail below, chute flap 34 is configured such that it will not open when subjected solely to the back pressure exerted by the product in the dispensing chute. The product is then obtained by the consumer when the consumer opens the chute flap and the product then falls out of the dispensing chute under the force of gravity.

As the dispensing cup moves from the B position to the C position during one rotation of knob 32, the dispensing cup located in the D position rotates into the B position. As it aches the B position, it is immediately filled with product. That dispensing cup then remains in the B position until the next rotation of the knob.

As intimated previously, the present invention will function effectively with a dispensing wheel having more or less than three dispensing cups. It is necessary to modify the gear ratio to correspond to the number of cups used in the dispensing wheel. For example, if a two-cup wheel is used, the gear ratio should be changed from three-to-one to two-to-one. Although a number of dispensing cups could be used in each dispensing wheel, it is presently preferred to use only three.

As mentioned above, a significant problem associated with the use of many types of products in vending machines of this type is that the product tends to "bridge." Bridging refers to the condition which exits when the product does not flow properly through the machine. Product bridging most frequently occurs when dispensing certain types of candy on warm days. The candy coating tends to get sticky because of the heat thereby increasing the friction between candies to the point that the candy will not flow.

Figure 4:
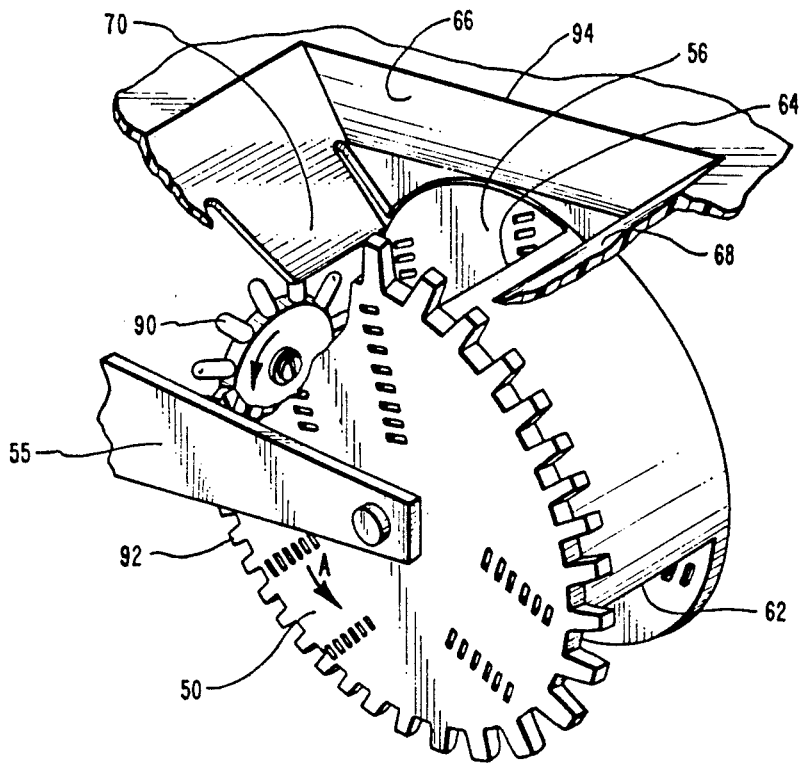
FIG. 4 is a perspective view of the dispensing wheel and the funnel of the product reservoir with portions cut away to more particularly illustrate the interconnection of the components.

The present invention reduces the possibility of product bridging in many ways. Referring now to FIG. 4, it can be observed that funnel 66 serves as a transition between the product reservoir and the dispensing cup. Thus, as the product flows from the product reservoir to the dispensing cup, it is subject to a gradual decrease in cross-sectional area. Whereas many prior art vending machines do not use any type of device to direct the product into the dispensing cup or use a channel which has the same cross-sectional area as the dispensing cup, the present invention utilizes a funnel which provides a substantial amount of area through which the product may flow at all times.

The funnel is configured such that the opening at the base of the funnel is longer than the length of the opening of the dispensing cup, as can be viewed by reference to FIG. 3. This reduces the possibility of bridging because the effective area of the "bottleneck" to created at the base of the product reservoir is increased.

As the dispensing wheel rotates, the configuration of the dispensing cup acts to stir and agitate the product. This also assists in reducing the possibility of product bridging. As can be viewed in FIGS. 3 and 4, as the dispensing wheel rotates in the direction of arrow A, trailing edge 64 of the dispensing cup travels along an arcuate path into the product located at the base of funnel 66, thereby agitating the product which will next enter the dispensing cup. During this same rotation of the wheel, the next dispensing cup will move into open connection with the product reservoir and the freshly agitated product will fill that dispensing cup.

Because the product has just been agitated, the product has not had time to settle into a bridging position. If candy is used as the product, the agitation which occurs as a result of trailing edge 64 passing through the candy will assist in disconnecting any candy which has been slightly stuck together as a result of sticky candy coverings. Because the candy is agitated and the next dispensing cup filled with candy during the same rotation of knob 32, the candy does not have sufficient time to bond together in a bridging position before it falls into the next dispensing cup.

Figure 5:
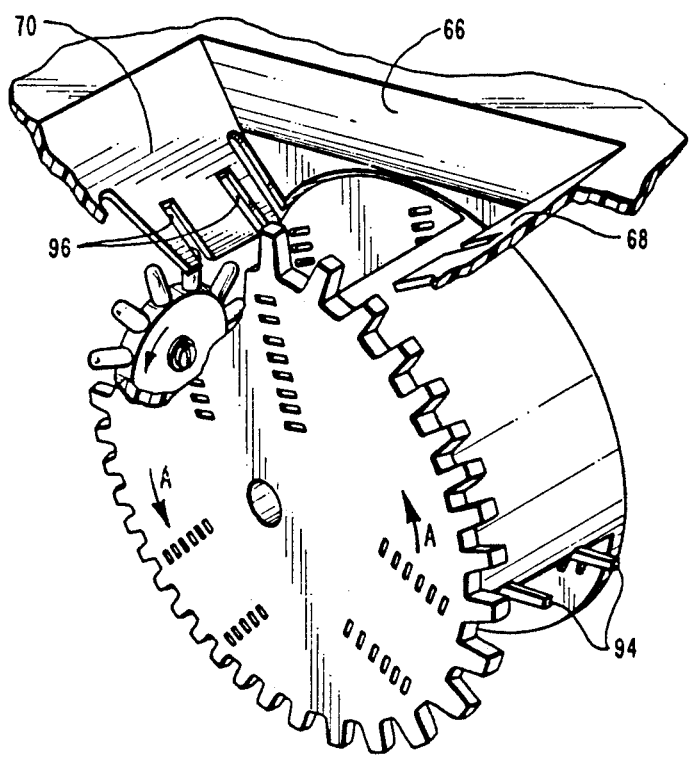
FIG. 5 is an alternative embodiment of the dispensing wheel illustrated in FIG. 4 with portions cut away to more particularly illustrate the interconnection of the components.

FIG. 5 illustrates an alternative embodiment of the dispensing wheel of the present invention which may be used for products which show an extraordinary tendency to bridge. The dispensing wheel of FIG. 5 utilizes paddles 94 attached to leading edge 62 of dispensing cup 56. Paddle slots 96 are provided in funnel backwall 68 and in scraper 70 which correspond to the positioning of the paddles on the dispensing wheel. Paddle slots 96 enable the dispensing wheel to rotate without the paddles interfering with the funnel backwall or the scraper.

As the dispensing wheel is rotated, paddles 94 stir the product immediately prior to the dispensing cup rotating into open connection with the product reservoir. Thus, paddles 94 serve substantially the same function as trailing edge 64 but, because they project a greater distance into the product, the product is agitated to a greater degree.

Although paddles 94 may be located at virtually any point between dispensing cups, it is presently preferred that if paddles are to be used, that they be located on leading edge 62, as illustrated in FIG. 5. Thus, the time between the agitation of the product and the filling of the dispensing cup is reduced to a minimum.

In order for a vending machine to be sufficiently versatile to effectively dispense a variety of products, it must have the capability to adjust the amount of product which is dispensed with each sale. The present invention includes a unique means for adjusting the volume of the dispensing cups. As viewed in FIGS. 3, 4, and 5, sidewalls 60 of each dispensing cup 56 are configured with a plurality of adjusting slots 98. Floor 58 of each dispensing cup is configured with a tab 100, illustrated in FIG. 6, which corresponds to each slot 98 in the sidewall of the dispensing cup.

The floor is adjusted by removing axial screw 54 thereby allowing the dispensing wheel to be broken down into its component parts. The floor is then placed at the desired level by inserting tabs 100 into the appropriate adjusting slots 98 and inserting axial screw 54 to hold the combination together.

In most situations it will be desirable to adjust all of the dispensing cups in the wheel with the same volume. However, it may also be desirable to adjust one of the three dispensing cups to have a substantially greater volume than the other two, thereby providing a "bonus" for every third purchase.

A plurality of adjusting slots 98 are provided, thereby allowing the volume of the dispensing cup to be adjusted to several different sizes. However, floor 58 may be adjusted at one level on one side and at a different level on its opposite side. This doubles the number of sizes available for the volume of the dispensing cup. Having the ability to incrementally adjust the volume of the dispensing cup enables the owner of the vending machine to more accurately control the amount of product dispensed with each sale. This is especially important when the product is small.

The dispensing cup may be adjusted according to the present invention without altering the area of the opening of the cup. In many prior art machines, the dispensing cup is adjustable, but only by altering the opening of the cup. If the area of the opening of the dispensing cup must be decreased in order to decrease the volume of the dispensing cup, the likelihood that the product will bridge increases.

A significant problem with many vending machines is that at various positions during their operation, the product may "bleed" from the product reservoir either into the dispensing chute or into other areas of the machine. For example, referring now to FIG. 3, a coin drawer 102 is located at the base of the machine. When a dispensing cup is in a position between position D and B, there exists the possibility that the dispensing cup is open to both the product reservoir and the area housing the coin drawer at the same time. The product could then enter the dispensing cup at the end open to the product reservoir and exit the dispensing cup into the coin drawer.

To prevent product from bleeding into the coin drawer, back antibleed flap 72 is mounted to funnel backwall 68. Back antibleed flap 72 extends along the dispensing wheel a sufficient distance such that as the dispensing cup comes into open connection with the product reservoir and product begins to flow into the dispensing cup, the back antibleed flap will seal off the remaining opening of the dispensing cup. Thus, no product can escape from the product reservoir into the coin drawer.

The danger also exists on many machines that the product will bleed through the front of the machine to the consumer. In FIG. 3, front antibleed flap 74 is illustrated. The plurality of bristles 80 on front antibleed flap 74 contain the product within the dispensing cup as the dispensing cup rotates from position B to position C. Front antibleed flap 74 is configured such that the opening of the dispensing cup remains covered until trailing edge 64 passes scraper 70.

Figure 6:
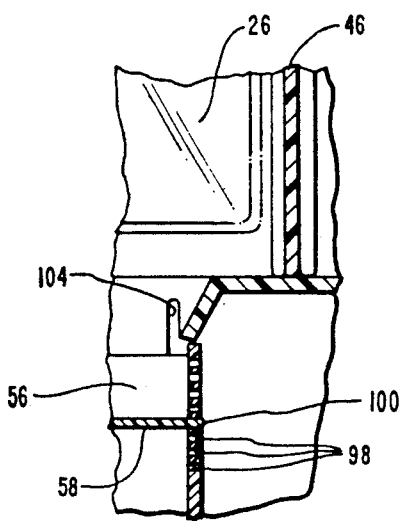
FIG. 6 is a cross-sectional view of the dispensing cup and the funnel of the product reservoir taken along line 6—6 of FIG. 3.

Scraper 70, illustrated in FIGS. 3 and 6, is mounted such that it is flexible. As can be seen in FIG. 6, a groove 104 along each side of scraper 70 allows the scraper to have sufficient flexibility that if a piece of product is protruding slightly above the dispensing wheel as the dispensing cup is rotated into the scraper the scraper will yield thereby allowing the product to pass through without breaking the product.

Bristles 88 on front antibleed flap 74 are also flexibly mounted. Thus, as the protruding product passes scraper 70, bristles 80 allow the product to continue to pass without breaking it. Bristles 88 may be provided in other configurations which are flexibly mounted and project toward the opening of the dispensing cup.

One of the most significant problems which have traditionally been associated with vending machines is their susceptibility to theft. The present invention incorporates a design which is highly resistant to theft. Indeed, the present invention prevents nondestructive intrusion into the machine.

"Nondestructive" intrusion refers to intrusion made capable by elastically deforming portions of the machine to gain entry. Vending machines of this nature are usually made of plastic in order to reduce manufacturing costs. However, a disadvantage of using plastic is that many types of plastic will readily "stretch" a sufficient amount to allow entry into the machine. This stretching or elastic deformation, is not permanent. Thus, it is difficult to ascertain whether a machine has been tampered with.

As previously mentioned, it has been found that machines are not broken into if the machine would be damaged or destroyed. However, if the plastic from which the machine is made is not stretched its elastic limit, no permanent, or "plastic," deformation will occur. The present invention prevents entry into the machine by taking advantage of the elasticity of the plastic used in the manufacture of the machine.

Referring now to FIG. 3, the vending machine of the present invention includes front housing 12 and back housing 14. The housing is manufactured in two parts to decrease the manufacturing costs and facilitate assembly of the machine. Front housing 12 is connected to back housing 14 at seam 16. The seam is spot welded with a sonic welder at incremental distances along the seam.

As illustrated in FIG. 3, the outside portion of seam 16 is smooth. Back housing 14 is configured with an offset 106 against which the edge of front housing 12 abutts. As back housing 14 approaches seam 16, its width increases such that when it is configured with offset 106, a minimum wall thickness is maintained. So configured, the seam is not subject to substantial separation with a screwdriver or other implement.

The configuration of lid 18 prevents similar entry to the product reservoir at the perimeter of the lid. Lid 18 is placed on the machine by sliding it in the direction of arrow E (see FIG. 2) along a track 108 formed at the top of the product reservoir (see FIGS. 2 and 3). As viewed best in FIG. 3, track 108 consists of two longitudingal C-shaped sections which fit together and run along the length of the machine, i.e., in the direction of arrow E in FIG. 2. The interconnection of the C-shaped sections of track 108 prevent entry into the product reservoir through the track.

Figure 7:
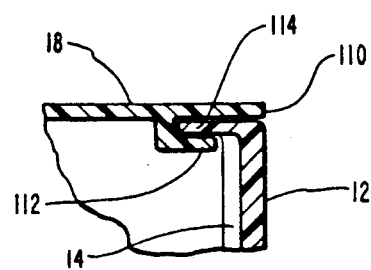
FIG. 7 is a cross-sectional view of the connection between the end of the lid and the side of the machine taken along line 7—7 of FIG. 2.

As lid 18 is slid completely on the top of the housing of vending machine 10, the leading edge 110 of lid 18, illustrated in FIG. 2, fits together with the corresponding upper edge of the housing to provide a similar connection. With reference now to FIG. 7, leading edge 110 of lid 18 is configured with a retaining arm 112 which extends along the length of leading edge 110. A lip 114 extends outwardly from the machine housing and is configured to fit within retaining arm 112.

Figure 8:
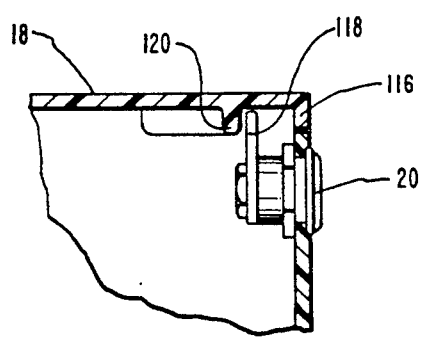
FIG. 8 is a cross-sectional view of the locking mechanism of the lid of the vending machine taken along line 8—8 of FIG. 1.

After lid 18 is slid into its position along track 108 and engages lip 114 at leading edge 110, the lid may be locked in place with a lock at trailing edge 116 of lid 18 (see FIG. 2). Lid lock 20 is mounted on the housing just beneath lid 18. Lid lock 20 is provided with a latch 118 which rotates when lid lock 20 is actuated with its key. A stop 120 is provided on lid 18 which prevents lid 18 from sliding along track 108 when latch 118 is in the locked position, as illustrated in FIG. 8.

Access door 22 is also configured to accommodate a lock. Access door lock 24 and lid lock 20 both have a noncircular geometry, as can be viewed by reference to FIG. 1. This prevents the locks from being forcibly rotated by someone trying to gain entry to the machine without the key.

Figure 9:
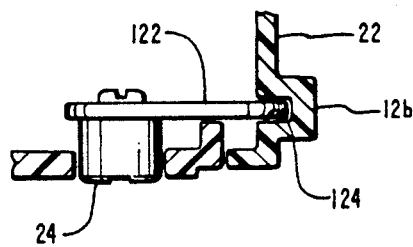
FIG. 9 is a cross-sectional view of the locking mechanism of the access door of the vending machine taken along line 9—9 of FIG. 1.

With reference now to FIG. 9, access door lock 24 includes a latch 122 which, when placed in the lock position illustrated in FIG. 9, engages a locking cavity 124 in access door 22. Locking cavity 124 is reinforced by configuring it within a reinforcing member 126 in access door 22. Reinforcing member 126 also provides extra strength to the locked edge of access door 22, thereby preventing any deflection of that edge of the door from forces applied to the door.

Figure 10:
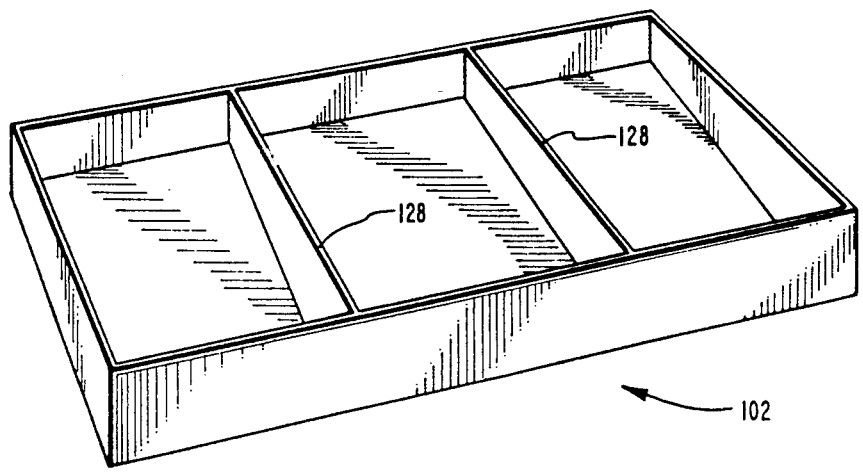
FIG. 10 is a perspective view of the coin drawer of the present invention.

As illustrated in FIG. 1, a presently preferred embodiment of the invention includes the capacity to vend three separate products. To facilitate ascertaining how much revenue is generated by each product, a sectional coin drawer is provided, as illustrated in FIG. 10. Coin drawer 102 includes partitions 128 to separate the coin drawer into three separate sections. Partitions 128 are placed in coin drawer 102 such that when the coin drawer is placed within the vending machine and the coin is expelled by the coin mechanism, the coin will fall into its corresponding section in the coin drawer.

A common practice used in connection with such vending machines is to mark the machine designating that the profits from one of the products will be donated to a particular charity. In such a situation, it is obviously advantageous to accurately ascertain the revenue generated by at least that particular product. This is made possible by using the coin drawer of the present invention.

The vending machine of the present invention also includes a novel chute flap design which eliminates the springs frequently associated with the chute flaps of the prior art. With particular reference to FIG. 3, chute flap 34 is eccentrically mounted with flap hinge 88 at the base of coin mechanism 28. Because flap hinge 88 is not in the same plane as that portion of the chute flap beneath flap hinge 88, a moment is created about flap hinge 88 which biases chute flap towards dispensing chute 84.

Chute flap 34 is preferably made of a metal or other material having a high weight density such that a moment of sufficient magnitude is created whereby chute flap 34 will resist opening when subject to back pressure from the product used in the vending machine.

The unique dispensing wheel design also facilitates emptying the product from the product reservoir when servicing the machine. Still referring to FIG. 3, when it is desirable to empty the product from the machine, back antibleed flap 72 may be removed and dispensing wheel 50 retracted such that an opening is created between the dispensing wheel and front antibleed flap 74. Dispensing wheel 50 may be removed from its axial mount by removing mounting arms 55 from over wheel axis 52.

The product may then flow from the product reservoir, through the opening created by slightly retracting the dispensing wheel, and down the dispensing chute where it may be collected by the person servicing the machine.

From the foregoing, it will be appreciated that the present invention provides novel methods and apparatus for vending a product utilizing a coin-operated vending machine which is small, mechanically dependable, and does not require electricity. Additionally, the present invention avoids the problem of product bridging. The unique funnel design, in combination with the dispensing cup and paddles, eliminate the problem of bridging in virtually all types of products.

The present invention also provides a unique system for adjusting the volume of product which is dispensed with each sale, while avoiding a corresponding decrease in the area of the opening of the dispensing cup. The present invention solves the traditional problem of product bleeding through the dispensing wheel to the coin drawer and to the dispensing chute by incorporating a novel front and back antibleed flap.

The present invention provides novel methods and apparatus for vending a product which are resistant to theft. All seams of the vending machine incorporate a unique overlap design which prevents nondistructive intrusion, such as is frequently attempted with an implement such as a screwdriver. Locks used on the access doors of the machine are also designed to prevent entry to the machine at those points.

The present invention includes a novel coin drawer design for distinguishing the amount of revenue generated by each type of product sold in the machine. Additionally, the present invention incorporates a chute flap which does not employ a spring. By eccentrically mounting the hinge flap, it is biased against the dispensing chute without the use of a spring. The present invention also enables the product to be emptied out of the machine when servicing the machine without having to turn over the machine or remove the product with a scoop.

It will be appreciated that the apparatus and methods of the present invention are capable of being incorporated in the form of a variety of embodiments, only a few of which have been illustrated and described above.

The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A coin-operated vending machine for dispensing a predetermined amount of product, comprising:

a reservoir for holding a product, the reservoir having an opening through which product may exit the reservoir;

a dispensing chute;

a wheel having a perimeter and at least one cup, the cup having an opening, the wheel being axially mounted to rotate axially in a vertical plane such that as the wheel rotates the cup may move through a first position wherein the cup is in open connection with the reservoir and a second position wherein the cup is in open connection with dispensing chute;

a coin mechanism which, when actuated, rotates the wheel; and a plurality of projections configured in the form of bristles, each projection having a free end, the projections configured such that the free end of each projection extends to the perimeter of the wheel such that as the wheel is rotated from the first position to the second position and wherein each bristle is flexibly mounted such that any product extending above the opening of the cup may pass through the projections as the wheel is rotated from the first position to the second position, the portion of the opening of the cup which is not in open connection with the reservoir is blocked when a portion of the cup is in open connection with the reservoir; and a scraper flexibly mounted adjacent the plurality of bristles.

* * * * *